(12) United States Patent
Barnes et al.

(10) Patent No.: US 6,168,544 B1
(45) Date of Patent: Jan. 2, 2001

(54) PULLEY LAGGING

(75) Inventors: Edwin Arthur Barnes, Sydney; Anthony John Lobb, Newcastle, both of (AU)

(73) Assignee: Flexible Steel Lacing Company, Downers Grove, IL (US)

( * ) Notice: Under 35 U.S.C. 154(b), the term of this patent shall be extended for 0 days.

(21) Appl. No.: 09/062,075

(22) Filed: Apr. 17, 1998

(51) Int. Cl.⁷ .................................................... F16H 55/48
(52) U.S. Cl. .................... 474/190; 474/191; 428/835; 428/843
(58) Field of Search .......................... 474/190, 191–192, 474/249–250, 185; 198/202, 835, 843, 836; 476/72; 428/43

(56) References Cited

U.S. PATENT DOCUMENTS

| | | | |
|---|---|---|---|
| 1,560,524 | * 11/1925 | Avery | 474/191 X |
| 2,162,279 | 6/1939 | Herchenrider . | |
| 2,628,709 | * 2/1953 | Steinmetz | 474/191 X |
| 3,961,736 | * 6/1976 | Fatula | 474/191 X |
| 4,290,761 | 9/1981 | Suginaka . | |
| 4,718,544 | * 1/1988 | Herren | 474/191 X |
| 5,580,629 | * 12/1996 | Dischler | 428/43 |

FOREIGN PATENT DOCUMENTS

| | | |
|---|---|---|
| B1 48-214/79 | 7/1980 | (AU) . |
| 67648/81 | 5/1981 | (AU) . |
| 44164/85 | 1/1986 | (AU) . |
| 54890/86 | 9/1987 | (AU) . |
| 16370/88 | 9/1988 | (AU) . |
| 7100471 | 1/1971 | (DE) . |
| 29 30 186 | 7/1980 | (DE) . |
| 62-177359 | 4/1987 | (JP) . |
| WO 82/00326 | 2/1982 | (WO) . |

* cited by examiner

*Primary Examiner*—David A. Bucci
*Assistant Examiner*—Marcus Charles
(74) *Attorney, Agent, or Firm*—Fitch, Even, Tabin & Flannery

(57) ABSTRACT

A lagging material for application to the surface of a pulley, said material being integrally formed in elongate strip form and having an upper surface including a plurality of discrete nodules extending therefrom and arranged regularly or randomly according to a predetermined pattern and including a plurality of longitudinally spaced apart elongate and transversely extending cutting sipes laterally defined by the nodules so as to form a partial or complete boundary wall of each sipe; wherein said nodules are arranged over the upper surface of said material so as to allow cutting of a predetermined size of lagging from a larger sheet or strip of said lagging by effecting cuts along or across said cutting sipes and between said nodules.

13 Claims, 1 Drawing Sheet

PULLEY LAGGING

BACKGROUND

This invention relates to lagging material for use with pulleys, conveyor drums and the like but more particularly relates to improvements in said laggings which results in wider versatility in fitment and improved performance. The invention also relates to a method of attaching such lagging material to the surface of such a pulley or conveyor drum. The present invention is particularly applicable for use in materials handling equipment and apparatus, such as mineral conveyors, grain elevators and the like. This is however by way of example only.

Throughout the specification and claims the term "pulley" should be defined as covering pulleys, drive wheels, drive rollers, conveyor drums and the like.

It is well known that the performance of pulleys in for example conveyor systems can be considerably enhanced by increasing the coefficient friction between the conveyor belt and the pulley. Increasing traction between the belt and pulley has a number of advantages, including reduction in slippage and corresponding increase in the life of the conveyor belt. Also, it results in reduction in the power required to drive the belt and, to a certain extent, a reduction in the size of a drive pulley required for certain uses and applications. In some cases, the ability to increase the coefficient of friction on drive pulleys is highly desirable. Further, it has been known for some time to provide materials for lagging pulleys, however many of these have been unsatisfactory and inefficient in use. It is a particular disadvantage with lagging known up until this time, that such lagging suffers from excess wear over a relatively short period of time, and is generally prone to allow unwanted slippage of the belt about the pulley resulting in reduced performance efficiency. This slippage can arise from an aqua planning effect which occurs when liquids such as water lie between the belt and the lagging over the contact areas.

Australian patent specification No. 575408, in the name of Flexible Steel Lacing Company, provides a lagging material having an upper surface with raised portions of a general diamond configuration. The contact surface of this lagging is generally quite smooth and where water penetrates between this surface of the lagging and a conveyor belt, slippage can occur.

It has also been known for some time to provide means for lagging pulleys with material having a high coefficient of friction. However, many such lagging materials have included metal backing plates or sheets, which have required specific attachment to the outer surface of a pulley. When it is desired to replace such lagging, it is necessary to detach the metal backing and the lagging attached thereto, this being time consuming and expensive, both from a material and labour point of view. Further, the time and expertise required in attaching and detaching such metal backed lagging, has meant that it is very difficult if not impossible to carry out replacement and repair in situ. Clearly, where many conveyor systems are used in mines and the like, there is a substantial advantage to be gained if lagging, repair and re-lagging can take place in situ and at the site of operation. In many known arrangements used up until this time, it has been necessary to take pulleys back to workshops or original places of manufacture, in order to successfully have the pulleys repaired or re-lagged. Lagging material including metal inserts, which operate in a similar manner, are also known and suffer from similar disadvantages. For example, such lagging is known from Australian patent specification No. 74155/81 (Holz).

Australian patent specification No. 584013, in the name of Flexible Steel Lacing Company, provides a lagging material wherein the upper surface includes ceramic material in the form of plates or tiles, to reduce wear on the lagging, slippage may still occur between the belt and ceramic lagging where water penetrates there between. This occurs to a greater extent where there is no give in the contact surface of the lagging as it is easier for a belt in this instance to overcome the coefficient of friction.

Effective gripping engagement between the underside of a conveyor belt and the outer contact surface of pulley lagging is dependent upon a number of factors which include:

a) coefficient of friction between belt and lagging;
b) amount of fluid collection between belt and lagging;
c) the material of the lagging;
d) the degree if any, of give in the lagging material at the belt surface/lagging contact surface interface;
e) total area of surface contact between belt and lagging;
f) ability of lagging surface configuration to dissipate water or other fluid which may otherwise reduce the coefficient of friction;
g) forces applied by the conveyor belt.

SUMMARY OF THE INVENTION

It has been found that the coefficient of friction is optimised where the lagging effectively dissipates fluid between belt and lagging, and where a lagging configuration and material is used which includes nodules which may deflect slightly under load to arrest slippage which would otherwise occur where the contact elements are rigid with no give or ability to deform or deflect, and where water or other fluid can be evacuated from between the belt and lagging by deformation of the material. This may be achieved by means of an array of nodules having interstitial spaces therebetween which allow axial and lateral deflection of each nodule and substantial passages for water dissipation.

Present invention to provide an improved lagging with wider versatility in fitting and overall improved performance and which overcomes or at least minimises one or more of the problems set out above and to provide a lagging material in which wear is decreased or minimised and in which inherent features of gripping and engagement (such as between the pulley surface and a conveyor surface) are enhanced.

It is an additional object of the present invention to provide a lagging material and method of lagging whereby pulleys can be repaired and have the alternative lagging attached thereto in a straightforward and efficient manner. An arrangement in accordance with the invention provides a lagging material and method of lagging, wherein the lagging can be applied to a pulley substantially in situ in a substantially straightforward and efficient manner. Other objects of this invention will become apparent from the following description.

According to one aspect of the present invention, there is provided lagging material for application to the surface of a pulley, said material being integrally formed in elongate strip form and having an upper surface comprising a plurality of raised protuberances according to a predetermined pattern, and including a plurality of longitudinally spaced-apart, elongate and transversely extending cutting sipes, defining raised portions therebetween. Preferably elongate trim lines being integrally formed or provided at predetermined intervals, e.g. between each row of protuberances on the upper surface of the lagging material. The protuberances may be formed by nodules or discrete elements attached to an upper surface of the lagging and which are capable of at least some deflection.

An arrangement in accordance with another aspect of the present invention may comprise, a lagging material for application to the surface of a pulley, said material being integrally formed in elongate strip form and having an upper surface comprising a plurality of raised protuberances arranged according to a predetermined pattern and including a plurality of longitudinally spaced-apart elongate and transversely extending cutting sipes defining raised portions therebetween;

wherein the lagging comprises an array of nodules forming said protuberances on said upper surface such that the pattern formed by the nodules allows cutting of the lagging in either the transverse or longitudinal directions and results in an increase in the coefficient of friction between the nodules and a conveyor belt surface.

An arrangement in accordance with another aspect of the present invention may comprise, a lagging material for application to the surface of a pulley, said material being integrally formed in elongate strip form and having an upper surface comprising a plurality of raised protuberances arranged according to a predetermined pattern and including a plurality of longitudinally spaced-apart elongate and transversely extending cutting sipes defining raised portions therebetween;

wherein the protuberances comprise an array of nodules between the cutting sipes.

An arrangement in accordance with another aspect of the present invention comprise, a lagging material for application to the surface of a pulley, said material being integrally formed in elongate strip form and having an upper surface comprising a plurality of raised protuberances according to a predetermined pattern and including a plurality of longitudinally spaced-apart elongate and transversely extending cutting sipes defining raised portions therebetween;

wherein the protuberances on the lagging comprise nodules which are disposed in an array such that the coefficient of friction between the belt and the array of nodules is increased in comparison to known lagging for a similar belt lagging surface contact area.

An arrangement in accordance with another aspect of the present invention may comprise, a lagging material for application to the surface of a pulley, said material being integrally formed in elongate strip form and having an upper surface including a plurality of discrete nodules extending therefrom and arranged according to a predetermined pattern and including a plurality of longitudinally spaced apart elongate and transversely extending cutting sipes laterally defined by the nodules so as to form side walls of each sipe; wherein said nodules are arranged over the upper surface of said material so as to allow cutting of a predetermined size of lagging from a larger sheet or strip of said lagging by effecting cuts along or across said cutting sipes and between said nodules.

BRIEF DESCRIPTION OF THE DRAWING

The invention will now be described by way of example only according to a preferred embodiment and with reference to the accompanying drawings, wherein.

DETAILED DESCRIPTION

Figure 1:
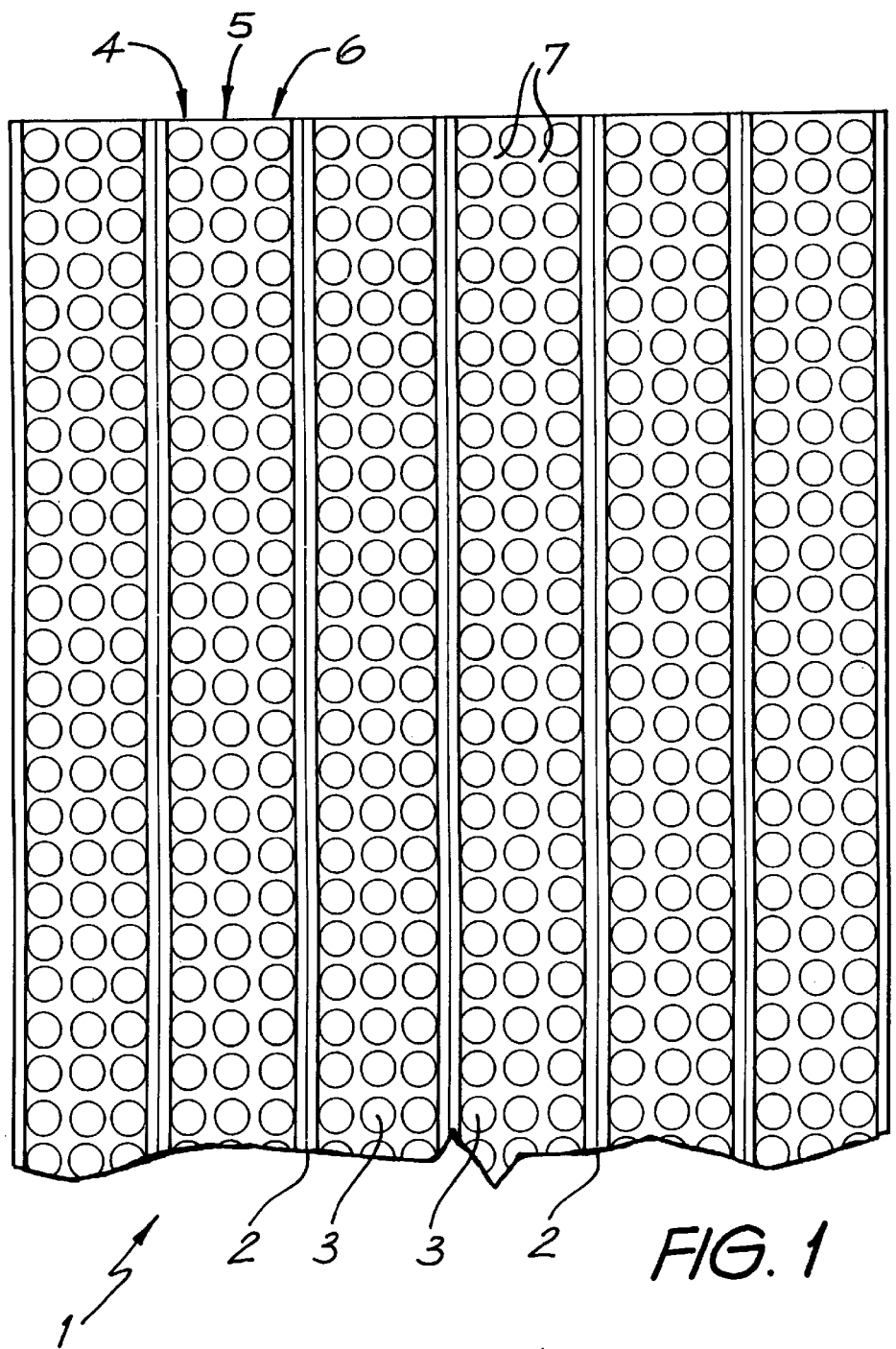
FIG. 1: is a plan view of the protuberant surface of lagging material for application to the surface of a pulley according to a preferred embodiment of the present invention.

According to a preferred embodiment of the invention there is provided a lagging material which is provided in substantially elongate strip form and which is formed on an upper surface thereof, with integral elongate sipes and trim lines, so that the elongate strip material can be cut to predetermined or desired lengths, such as for passing around the outer surface of a pulley, by cutting along or through the elongate sipes and/or trim lines.

The sipes and trim lines are integrally formed or moulded into the material of the lagging and preferably extend below the upper surface thereof, so that the upper surface is partly formed as a plurality of raised portions in the form of nodules or protuberances in rows which form the wear surfaces of the lagging. Throughout the specification, the term sipe should be taken generally to mean a recess located between rows of nodules which enables convenient cutting of the lagging. To facilitate cutting, trim lines may be provided in the recesses to guide the cutting instrument.

The nodules or protuberances can be of any shape, size or diameter provided there exists a bearing surface at their upper extremity which is readily able to conform to the underside of the conveyor belt to provide better grip and support, with less slippage and less wear. The nodules are preferably cantilevered from the upper surface of the pulley and are able to such that the free end of each nodule may undergo axial compression and lateral deflection under working loads applied to the nodules by a conveyor belt. The ability of the nodules to collectively compress and deflect under belt load reduces the chance of belt slippage which would occur to a greater degree where the wear elements on the lagging are stiff and rigid.

The provision of sipes and trim lines, and the ability to be able to cut the lagging material between rows of nodules in either direction, horizontally or longitudinally, makes it possible to readily fit the lagging material to virtually any pulley in virtually any location, including on site fitment. This has the potential to drastically reduce the down time of a conveyor system during maintenance or the retro-fitting of lagging material to a pulley.

The unique design of the lagging material according to the present invention makes it possible to fit lagging material to a pulley without the need to measure the material, simply by overlapping the last two strips of material and cutting the closing piece with a Stanley knife or the like.

In the case of lagging material made from polyurethane, which does not adhere directly to steel pulleys, the polyurethane is first bonded to a rubber backing to provide a composite lagging material which will adhere to the steel pulley with conventional adhesives or bonding techniques.

The lagging is preferably formed of an appropriate material such as natural or synthetic rubber, neoprene, nitrile, polyurethane, or other polymeric materials which have been formed or compounded to meet requirements of the particular use concerned, such as for example the non-toxic requirements of the food industry, or the mining industry regarding fire and antistatic properties. This is by way of example only.

The lagging material is formed or provided in elongate strip form, which can for example extend about a roller so that the strip material is in roll form, being of a width to adequately cover the width of a pulley, but to eliminate as far as possible wastage.

In a preferred form of the embodiment, the back or underside of the lagging material is buffed during manufacture so as to assist in adhering or bonding the lagging to the face of a pulley, in situ. As will be appreciated, this substantially decreases the time involved in repairing or replacing lagging, such as has been involved in the repair or replacement of lagging involving metal backing strips. Thus, in a preferred form of the embodiment, the backing or underside of the lagging material is buffed or prebuffed, so as to provide a ready surface for adhering or bonding to the upper outer surface of the pulley face.

In some embodiments of the invention, hard wearing material such as ceramic inserts may be attached to or embedded in the raised nodules at the outer surface, so as to assist in usage and effectiveness, and to reduce wear. The ceramic material is preferably an alumina ceramic material.

The provision of discrete rows of nodules, with channels or pathways in between, allows for more efficient water dissipation or water shedding. By fast removal of any water which may be present, the friction coefficient is greatly improved, reducing slippage between belt and pulley under wet conditions. The improvement in the coefficient of friction between the belt and nodules derives from an increased area of contact between the nodules and belt and also the mechanical behaviour of the individual nodules in terms of their interaction with the belt surface in that they axially compress and/or laterally deflect depending upon the effective tension applied at a given tangential position about the pulley to which the lagging is attached. The nodules are disposed in transverse and longitudinal alignment which allows cutting of the lagging to a predetermined size in the longitudinal or transverse directions and without reducing the contact area by cutting through any of the nodules. Furthermore, the nodules may provide a guiding surface along which a cutting knife travels. Also, the lagging according to the present invention is as a result of the use of the unique array of discrete nodules, lightweight and is particularly though not exclusively useful in the food industry.

Similarly, the design of the nodules is effective for use in dry and dusty conditions. It is essential in this case that the lagging material must have good abrasion resistance to cope with the fine dust which is present, and which invariably becomes trapped between the pulley surface and the belt, causing excessive wear as well as slippage.

Referring to FIG. 1 there is shown a plan view of a section of pulley lagging according to a preferred embodiment of the present invention. The lagging material 1 comprises a series of cutting sipes, 2 spaced apart from each other such that a raised portion is defined therebetween and comprises an array of nodules 3 arranged according to a predetermined pattern. Typical rows of nodules are indicated by numerals 4, 5 and 6 and according to the embodiment shown there are three rows which are disposed between two cutting sipes. It will be appreciated that less than or more than three rows could be introduced in which case the cutting sipes would be either closer or wider apart, depending upon row selection. The nodules are spaced in such a way that rows are also formed in an alignment perpendicular to the direction of cutting sipes 2. When the lagging is attached to a pulley, cutting sipes 2 run transversely, that is, parallel to the pulley axis such that the longitudinal length of the lagging is taken as the circumferential distance or a component of it around the pulley.

The spaces between each nodule shown by way of example by numeral 7 allows for speedy dissipation of any water which collects between the contact surfaces of the nodules and the underside of a pulley belt.

Figure 2:
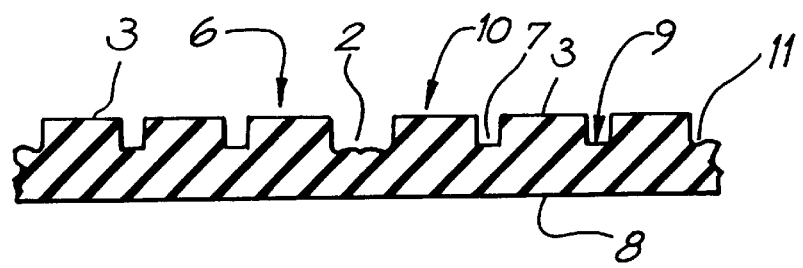
FIG. 2: is a cross-sectional view of the lagging material according to the embodiment depicted in FIG. 1.

Referring to FIG. 2 there is shown a cross sectional view through a small section of lagging. The lagging comprises underside surface 8 and nodules 3 which extend upwardly from upper surface 9 such that each individual nodule is effectively cantilevered from the upper surface 9 of the lagging. The nodules are integral with the lagging and are evenly spaced apart so as to form interstitial spaces 7. Nodule rows 6 and 10 define typical cutting sipe 2 such that the rows effectively form side walls for the cutting sipes. Preferably the cutting sipes, which include trim lines 11, provide a guide for a cutting instrument such as a knife to facilitate a straight cut.

Whilst the embodiments described in FIGS. 1 and FIG. 2 are preferred, it will be appreciated that the nodules could be arranged in a less regular and thus random fashion according to requirements provided there are sufficient nodules to ensure an acceptable total surface contact area with the conveyor belt surface.

It will be appreciated that the present invention provides a lagging material which is able to be used in a straightforward and efficient manner in the covering of pulleys, and which in use overcomes the disadvantages brought about by lagging used up until this time. Further, the method of the present invention allows for the attachment of lagging in a straightforward and efficient manner and which in particular allows length of lagging material to be cut and mounted to the pulley without expensive and time consuming labour or machinery requirements. These have been required with the attachment and removal of lagging used up until this time. According to the method aspect, urethane is bonded to the rubberised lagging so that when in the field the lagging can be readily bonded to a pulley.

The invention has been described by way of example only and it should be appreciated that modifications and improvements may be made thereto without departing from the scope or spirit thereof.

What is claimed is:

1. A lagging material for application to the surface of a pulley, said material being integrally formed in elongate strip form and having an upper surface including a plurality of discrete nodules extending therefrom such that a free end of each nodule is capable of undergoing axial and lateral deflection responsive to the action of a conveyor belt, wherein the axis of each nodule is substantially perpendicular to the plane of the upper surface of the lagging, said nodules being integral with the said upper surface and formed from the same material and arranged on said upper surface according to a predetermined pattern and including a plurality of longitudinally spaced apart elongate and transversely extending cutting sipes laterally defined by the nodules so as to form a partial or complete boundary wall of each sipe, wherein said nodules are arranged over the upper surface of said material so as to allow cutting of a predetermined size of lagging material from a larger sheet or strip of said lagging material by effecting cuts along or across said cutting sipes and between individual said nodules.

2. A lagging material according to claim 1 wherein the nodules are arranged in rows intermediate each cutting sipe such that one row of nodules defines one side of a cutting sipe and another row will define the other side of said sipe.

3. A lagging material according to claim 2 wherein each said nodules in said rows are in alignment or are staggered.

4. A lagging material according to claim 3 wherein there are at least three rows of nodules intermediate two cutting sipes wherein the axis of each said rows is parallel to said cutting sipes.

5. A lagging material according to claim 4 wherein there are additional rows of nodules such that the axis of each said additional row is generally transverse to the direction of the cutting sipes and said rows are each formed by at least three nodules in alignment.

6. A lagging material according to claim 1 wherein the bending and axial deflection of each nodule improves the gripping engagement between a pulley belt and said lagging.

7. A lagging material according to claim 6 wherein interstitial spacing between the nodules forms channels such that fluid collecting between an upper surface of one or more of each said nodules and an underside surface of a conveyor belt is disbursed via the interstitial spaces of said nodules.

8. A lagging material according to claim 7 wherein one nodule in a given row is equidistant from adjacent nodules.

9. A lagging material according to claim 1 wherein each nodule is substantially cylindrical.

10. A lagging material according to claim 9 wherein the nodules are formed from either polyurethane, neoprene, nitrile synthetic rubber or other polymeric material.

11. A lagging material according to claim 1 wherein the nodules are arranged so that the coefficient of friction between the belt and pulley is increased beyond that of known belt lagging arrangement having substantially the same contact area.

12. A lagging material according to claim 1 wherein an upper surface of each nodule is embedded with a ceramic insert to increase wear resistance.

13. A lagging material according to claim 1 wherein an upper surface of each nodule is embedded with a ceramic insert to increase wear resistance.

\* \* \* \* \*